United States Patent [19]

Haussmann et al.

[11] 4,202,557

[45] May 13, 1980

[54] DRILLING DEVICE

[75] Inventors: August Haussmann, Oberzell; Siegfried Klaissle, Linsenberg; Hermann Hugger; Bernhard Moser, both of Altshausen; Walter Müller, Weingarten; Wolfgang Peetz, Blitzenreute, Biegenburg; Anton Scheuch, Ravensburg; Gerhard Schwarz, Blitzenreute, all of Fed. Rep. of Germany

[73] Assignee: Hawera Probst GmbH & Co., Ravensburg, Fed. Rep. of Germany

[21] Appl. No.: 959,525

[22] Filed: Nov. 13, 1978

Related U.S. Application Data

[63] Continuation of Ser. No. 797,504, May 16, 1977, abandoned.

[30] Foreign Application Priority Data

May 15, 1976 [DE] Fed. Rep. of Germany ....... 2621809

[51] Int. Cl.[2] ........................ B23B 31/06; B23B 31/10

[52] U.S. Cl. ...................................... 279/19.5; 279/82

[58] Field of Search ................... 408/226, 239, 239 A, 408/230, 240; 279/1 B, 1 TE, 19, 19.5, 75, 76, 82

[56] References Cited

U.S. PATENT DOCUMENTS

| | | | |
|---|---|---|---|
| 1,862,337 | 6/1932 | Emrick | 279/75 |
| 2,767,988 | 10/1956 | Dietrich et al. | 279/19.5 |
| 3,195,909 | 7/1965 | Winnen | 408/239 X |
| 3,436,086 | 4/1969 | Glenzer | 279/75 |
| 3,830,135 | 8/1974 | Sullivan | 279/76 X |
| 3,945,653 | 3/1976 | Falchle | 279/76 X |

*Primary Examiner*—Horace M. Culver

*Attorney, Agent, or Firm*—Becker & Becker, Inc.

[57] ABSTRACT

A drilling device with an arrangement for the detachable connection of a drill, especially a rock drill, percussion drill, hammer drill, and the like, to a receiving device, e.g. a drive head, which has a longitudinal bore for receiving the shank of the drill, and also has a driving part which is drivingly connectable to a drilling machine and is coaxial with the longitudinal bore. The drilling device furthermore comprises a drive transmitting member movable in the driving part transverse in the longitudinal bore of the receiving device. The drive transmitting or follower member is arranged to engage a bottom face of a recess in the shank of the drill. This recess has a segment-shaped cross section and has a bottom extending continuously over the entire corresponding width of the drill shank. On the driving part a securing part is mounted which is movable substantially in axial direction of the driving part into a position in which the drive transmitting member is arrested in its drive transmitting position and also into a position in which the drive transmitting member is released from its drive transmitting position and action.

14 Claims, 7 Drawing Figures

DRILLING DEVICE

This is a continuation application of parent application Ser. No. 797,504-Haussmann filed May 16, 1977, now abandoned.

The present invention relates to a drilling device with an arrangement for the detachable connection of a drill, particularly a rock drill, percussion, hammer drill or the like, to a receiving device which has a longitudinal bore for receiving the shank of said drill, and also has a driving part which is drivingly connectable to a drilling machine and is coaxial with said longitudinal bore. The said device furthermore comprises a drive transmitting member movable in the driving part transverse to said longitudinal bore. The drive transmitting or follower member is arranged to engage a bottom face of a recess provided in said drill shank.

A drilling device of this kind has been described in German Gebrauchsmuster No. 7,439,278 according to which the driving of the drill is effected by means of a bolt of hardened steel or hard metal which bolt is readially movably guided in a cross bore of the driving part and is held in driving engagement with the driving part by a resilient band placed upon the outside of the driving part while being under elastic tension.

It is an object of the present invention, on the one hand, to facilitate the exchanging of one drill for another drill, and on the other hand to insure that, after such an exchange, the new drill can be firmly and safely held in the receiving device.

These and other objects and advantages of the invention will appear more clearly from the following specifications in connection with the accompanying drawings, in which.

Figure 1:
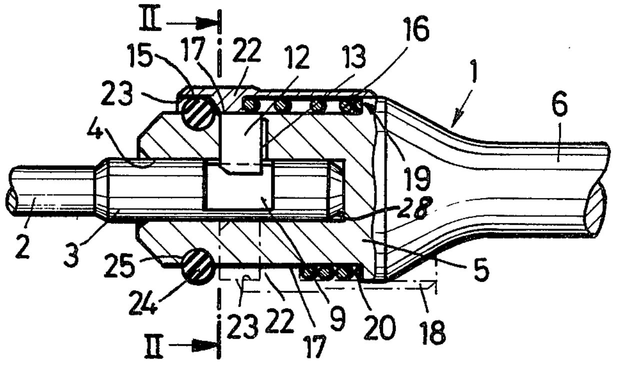
FIG. 1 shows partly in section and partly in elevation one form of a drilling device according to the invention.

The drilling device according to the invention is characterized primarily in that the recess has a segment-shaped cross section and has a bottom extending continuously over the whole corresponding width of the drill shank, and that on the driving part a securing part is mounted which is movable substantially in axial direction of the driving part into a position in which the drive transmitting member is arrested in its drive transmitting position and also into a position in which said drive transmitting member is released from its drive transmitting position.

In view of the design according to the invention, the drill inserted in the receiving device can be held satisfactorily by the securing part. The drill can in both directions of rotation be positively connected to the receiving device so that a high degree of operational safety of the drilling device will be assured. The drill may be introduced into and be withdrawn from the longitudinal bore of the receiving device without additional tools when the securing part has been moved into its releasing position. In view of the fact that, according to the invention, the recess has a segment-shaped cross section, the recess in the drill shank can be produced in a very simple manner so that the manufacture of the drill may be carried out economically.

Referring now to the drawings in detail, the drilling device has a receiving device 1 and a rock drill the shank 2 of which has a thickened end zone 3 which is inserted in a longitudinal bore 4 of a driving head 5 of the driving part of the drilling device. The drill is held against rotation with respect to the driving head. The driving head 5 is part of the receiving device 1 and has a driving pin 6 arranged coaxially with the longitudinal bore 4. The driving pin 6 has a substantially shorter diameter than the driving head 5 and serves for connecting the drilling device to a drilling machine (not shown).

Figure 6:
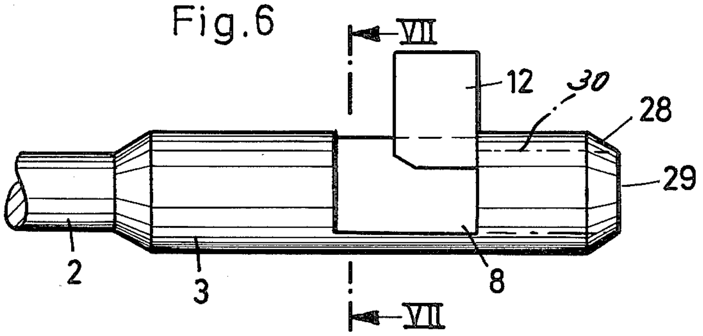
FIG. 6 illustrates the drill shank of a rock drill in side view.
Figure 7:
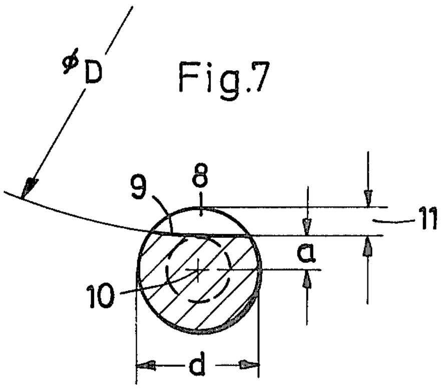
FIG. 7 shows a section taken on the line VII—VII of FIG. 6.

For purposes of transmitting the driving torque from the drilling machine to the drill shank 2, there is provided in the end zone 3 a drive transmitting recess or pocket 8 (FIG. 6). The recess 8 has a segment-shaped radial cross section through the shaft 2. The bottom 9 of the recess 8 forms a drive transmitting surface which extends as a major segment in a chord form over the radial erase section of the drill shaft 2. The drive transmitting surface of bottom 9 has a distance a from the drill axis 10 (FIG. 7), which distance advantageously amounts to about 1/5th of the diameter d of the end zone 3 of the drill shank 2. In the specific embodiment shown in the drawing, the surface of the bottom 9 is produced with the aid of a disc cutter the chip removing mantle face of which has a working diameter "d" which advantageously amounts to from 60 to 140 mm, in the embodiment shown about 120 mm.

Figure 2:
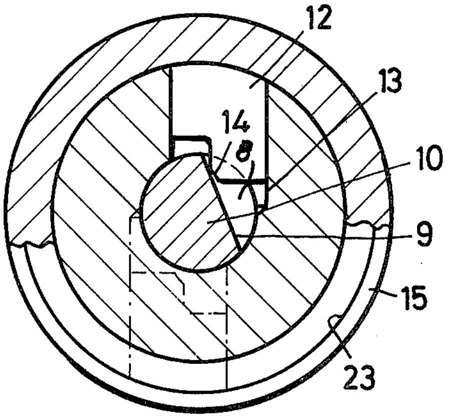
FIG. 2 is a section taken along the line II—II of FIG. 1.

For the positive driving engagement of the drill, there is provided a drive transmitting member 12 in the form of a bolt which is guided in a cross bore 13 in the driving head 5. The member 12 has its front face which faces the drill shank (FIG. 2) stepped in the manner of a stairway and has a stepped edge 14 contacting the face 9 which edge 14 extends in the vicinity of the diametrical line of the bolt cross section and of the cross bore 13.

Figure 3:
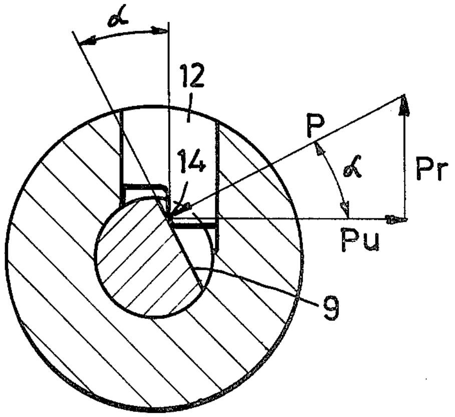
FIG. 3 shows the same section as FIG. 2 and illustrates the driving forces which occur when the drive transmitting member is in its drive transmitting position.

In view of this design of the front face of the member 12 a very favorable pressure distribution is realized which is shown more precisely in FIG. 3. The stepped edge 14 rests on the face 9 in such a way that a tangential angle $\alpha$ results which suitably lies between 5° and 45° and advantageously amounts to from 20°-30°.

In the specific embodiment shown, the receiving device 1 and its driving head 5 are surrounded by a securing part 15 which is displaceable longitudinally in axial direction and which is designed as a sleeve by means of which the member 12 can be locked in the driving position as shown in FIG. 1 in full lines.

The sleeve 15 is under the pressure of a coil spring 16 arranged coaxially with the driving head 5. This spring tends to hold sleeve 15 in such a position relative to the driving head 5 or to move sleeve 15 into said position in which said sleeve overlaps said transverse bore 13 by means of a bore section 17 of its axial bore which bore section is relatively narrow in axial direction, while said spring 16 supports the member 12 mounted in transverse bore 13 against the radial drive conveying forces exerted upon said member 12.

The sleeve 15 is tubular at its end section 18 on the driving side and is mounted with slide fit on an annular collar 19 located at the zone at which the driving head 5 merges with the driving pin 6. This annular collar is bounded by an annular shoulder 20 which on the drill side extends crosswise to the driving axle, the coil spring 16 abutting said shoulder. The oppositely located abutment face 21 for the coil spring 16 limits the axial extension of the bore section 17 which in the position indicated in FIG. 1 by dot-dash lines can be displaced so far to the rear by traction on the sleeve 15 that the bore section 17 releases the member 12 in the radial direction so that the member 12 can turn aside outwardly when by rotation of the drill counter to its normal drilling direction, the member 12 is displaced toward the outside into its release position shown in FIG. 1 in dot-dash lines. The drill 2 may then be withdrawn from the longitudinal bore 4 of the driving head 5.

For receiving the member 12 in the release position of the sleeve 15, as indicated in FIG. 1 by dot-dash lines, the sleeve 15 has on its drill side an end section 23 reaching from the inner collar 22 to the front end of the sleeve 15. Section 23 allows for sufficient radial deflection of the member 12 and in its drive conveying position engages over an O-ring 24 limiting the axial movement of the sleeve 15, said O-ring being inserted in an annular groove 25 provided in a cylindrical circumferential face of the driving head 5. In the embodiment shown, the O-ring consists of rubber. During operation of the drilling device, the O-ring 24 also serves as a seal and prevents drilling dust and the like from reaching the receiving device 1.

Figure 4:
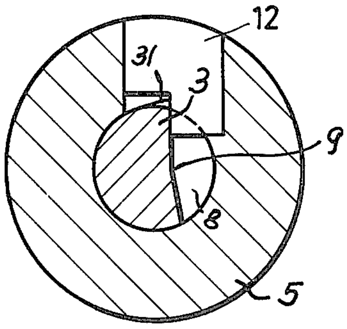
FIG. 4 shows a radial section through a drilling device in which an edge region of the bottom face of the recess in the drill shank has been hammered radially outwardly.
Figure 5:
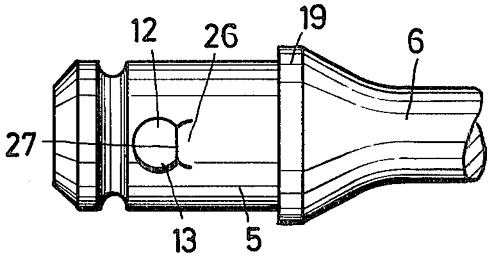
FIG. 5 shows a driving head of the driving part of the driving device.

The construction of the receiving device 1 shown, and in particular of the driving head 5 in conjunction with the sleeve 15 as well as with the member 12, insures an easily detachable but rotationally fixed connection between the drill and the driving machine while the possibility indicated in FIG. 4 that the drill shaft upon drilling becomes hammered out radially is substantially avoided. Due to this undesired hammering out there is formed a burr 31 projecting radially outwardly on the edge of the face 9 which prevents the drill from being able to be withdrawn from the longitudinal bore 4 of the driving head 5.

The member 12 is slightly flattened on its rear mantle face 27 while the transverse bore 13 on its zone which is adjacent to the circumferential surface of the driving head 5 penetrates the transverse bore 13, i.e. is upset thereinto. This penetration or upsetting forms an assurance against accidental turning of the member 12 and makes sure that member 12 always takes up the correct position in realtion to the face 9. The flattened mantle face 27 of the member 12 at the same time serves as an axial limitation when, for example, on removal of the drill from its drill hole, the drill becomes jammed in the hole and the receiving device 1 is pulled to loosen the drill. In such an instance, (FIG. 6) the member 12 bears against the rear side face 7 by which the recess 8 is limited in the axial direction. Upon drawing back, the member 12 lies flat on the side face 7 of the recess 8 so that the forces occurring during drawing back operations are transmitted between flat faces from the member 12 to the side face 7. As a result thereof in an advantageous manner burr formation on the side face can be obviated which would occur in the case of line contact and would render the removal of the drill from the receiving device more difficult.

The end zone 3 of the drill shank 2 has a bevel 28 the size of which corresponds approximately to the depth 11 of the recess 8. The truncated cone formed by the bevel 28 facilitates the introduction of the drill shank into the receiving device 1 because by means of the bevel 28 the member 12 can be pushed radially outward when the sleeve 15 is in the released position indicated in FIG. 1 with dot-dash lines.

In addition, by means of the bevel 28, the plane face 29 on the rear front side of the drill shank is considerably reduced. As a result thereof, the impact forces exerted by impact and hammer drilling on the plane face 29 are prevented from causing a buckling of the drill shank in the region of the recess 8 arranged only on one side. For avoiding a buckling in the region of the recess 8, the plane face 29 advantangeously has such a position that a cylindrical core 30 (FIG. 6) containing this plane face of the end zone 3 of the drill reaches at the most as far as the face 9 of the recess 8 so that the cylindrical core 30 has a constant cross section over the whole length of the end zone 3.

The particular advantage of the drilling device described consists in that with a diameter of the end zone 3 of from 10–12 mm provided with the recess 8 the drilling tool may have a working diameter of up to 20 mm. Due to the forced locking with the aid of the sleeve 15 the drills used are held in both directions of rotation whereby a considerable increase in the operational safety is realized. In addition thereto, the drill is prevented from jamming and deforming in the receiving device.

The design of the receiving device furthermore permits a rapid exchange of drilling tools without additional aids such as keys, wedges or the like.

In the illustrated and above described embodiment the face 9 is curved slightly convex. However, said face 9 may also be formed flat or slightly concave. It is merely essential that said face extends constantly over the whole pertaining width of the end zone 3.

It is, of course, to be understood that the present invention is, by no means, limited to the specific showing in the drawings, but also comprises any modifications within the scope of the appended claims.

We claim:

1. A drilling device for a drill which includes in combination: a driving head drivingly connectable to a drilling machine and having an axial bore for detachably receiving a drill shank, said driving head also having a transverse bore leading from the periphery of said driving head into said axial bore, a dual function drive transmitting member said drill having said drill shank thereof insertable into said driving head and provided with a continuous recess having a segment-shaped cross section and a bottom surface convex in radial section relative to the drill axis and in a radial cross section having a chord form for engagement with said drive transmitting member, said drive transmitting member including a diametrical line of a cross section of said axial bore and also including a stepped edge on one side of the diametrical line, said recess being on said one side of said diametrical line with said stepped edge engaging against the bottom surface of the recess, said drive transmitting member being movable in said transverse bore into a first position representing the drive transmitting position for transmitting driving movement directly onto a drill when such drill has been inserted into said axial bore and said drive transmitting member also being movable into a second position in which said drive transmitting member is out of said drive transmitting position, and adjustable means movable on said driving head selectively into a locking position for locking said drive transmitting member in said first position and into a release position for releasing said drive transmitting member out of its first position and to allow movement of said drive transmitting member into said second position, said recess in the axial direction of said drill shank being limited by at least one cross face extending perpendicularly to the axis of said drill; spring means continuously urging said adjustable means into its locking position, said adjustable means including a sleeve surrounding said driving head, and said spring means being a coil spring arranged between said sleeve and said driving head, said coil spring being coaxial with said sleeve and said drive head.

2. A drilling device in combination according to claim 1, in which the bottom face of said recess is spaced from the drill axis by a distance amounting up to 40% of the diameter of the drill shank.

3. A drilling device in combination according to claim 1, in which said bottom face of said recess is spaced from the drill axis by a distance amounting to 20% of the diameter of said drill shank.

4. A drilling device in combination according to claim 1, in which the drill shank has an end including a bevelled, conically truncated zone.

5. A drilling device in combination according to claim 4, in which said truncated conical zone encloses with the drill axis an angle of about from 30° to 40°.

6. A drilling device in combination according to claim 4, in which the truncated conical zone is bound by a plane face having a diameter which amounts up to twice the distance of the bottom face of said recess from the drill axis.

7. A drilling device in combination according to claim 6, in which the cylindrical core of the drill shank containing the plane face as the front face reaches at the most up to the bottom face of said recess.

8. A drilling device according to claim 1, in which said sleeve has an arresting section projecting approximately radially inwardly for contacting said drive transmitting member in the locking position of said sleeve and for holding said drive transmitting member in its first position against the driving forces radially exerted upon said drive transmitting member.

9. A drilling device in combination according to claim 8, in which said driving head has a shank and an annular collar adjacent said shank and in which said sleeve has a tubular section mounted on said annular collar with slide fit.

10. A drilling device in combination according to claim 9, in which said arresting section is arranged on that side of said sleeve which is remote from said annular collar and has an inner collar which has a smaller bore diameter than the sleeve section mounted on said annular collar with diameter than the sleeve section mounted on said annular collar with slide fit.

11. A drilling device in combination according to claim 9, in which said driving head has a cylindrical circumferential surface and has that end portion thereof which is remote from the shank of said driving head provided with an annular groove, elastic ring means being inserted in said groove and serving as an axial stop for said sleeve.

12. A drilling device in combination according to claim 11, in which said sleeve adjacent said ring means has a section surrounding and confining said annular ring means where said sleeve is in locking position.

13. A drilling device in combination according to claim 11, in which said drive transmitting member has that end zone thereof which faces toward said bottom face of said recess provided with a stepped section engaging said bottom face with said stepped edge which extends in the vicinity of the line of the cross section of said drive transmitting member.

14. A device in combination according to claim 1, which includes an outer raised portion provided on a wall of said transverse bore and said drive transmitting member having a flattened mantle face part, said flattened part contacting said outer raised portion.

* * * * *